United States Patent [19]

Schafer

[11] 3,917,763

[45] Nov. 4, 1975

[54] AERATOR

[75] Inventor: James P. Schafer, Minneapolis, Minn.

[73] Assignee: Frank D. Werner, Jackson, Wyo.

[22] Filed: Sept. 4, 1974

[21] Appl. No.: 503,101

Related U.S. Application Data

[63] Continuation of Ser. No. 286,236, Sept. 5, 1972, abandoned.

[52] U.S. Cl. ............................................. 261/87
[51] Int. Cl.² .......................................... B01F 3/04
[58] Field of Search ................ 261/85, 87, 93, 122

[56] References Cited

UNITED STATES PATENTS

| 1,242,445 | 10/1917 | Ittner | 261/87 |
|---|---|---|---|
| 1,374,446 | 4/1921 | Greenawalt | 261/87 |
| 2,141,047 | 12/1938 | Schulte | 261/93 |
| 2,673,724 | 3/1954 | Potts | 261/87 |
| 2,996,287 | 8/1961 | Audran | 261/87 X |
| 3,108,146 | 10/1963 | Gross | 261/93 X |
| 3,650,513 | 3/1972 | Werner | 261/87 |
| 3,677,528 | 7/1972 | Martin | 261/87 |

FOREIGN PATENTS OR APPLICATIONS

| 511,871 | 8/1939 | United Kingdom | 261/122 |

*Primary Examiner*—Tim R. Miles
*Assistant Examiner*—Richard L. Chiesa
*Attorney, Agent, or Firm*—Dugger, Johnson & Westman

[57] ABSTRACT

An aeration device comprising a rotating disc having openings through which a fluid can be passed to be dispersed into a liquid in which the disc is rotating. The majority of the openings are on the upper wall only in order to increase the efficiency of the aeration in relation to the horsepower required for operation.

7 Claims, 3 Drawing Figures

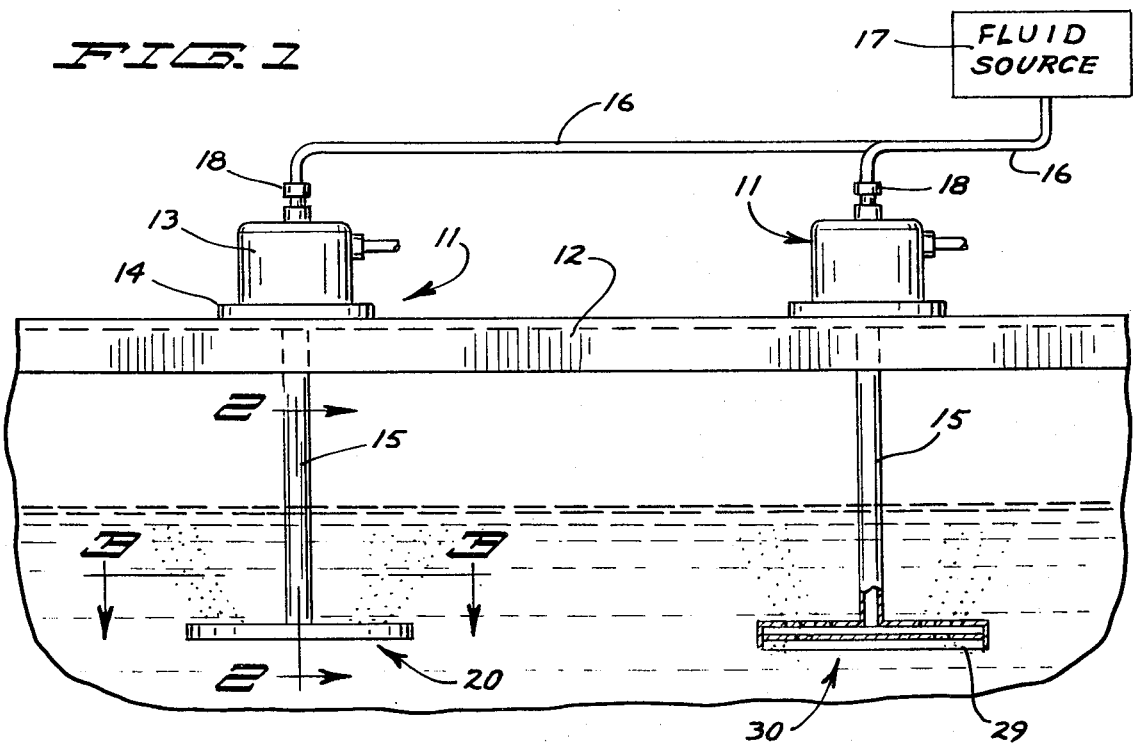
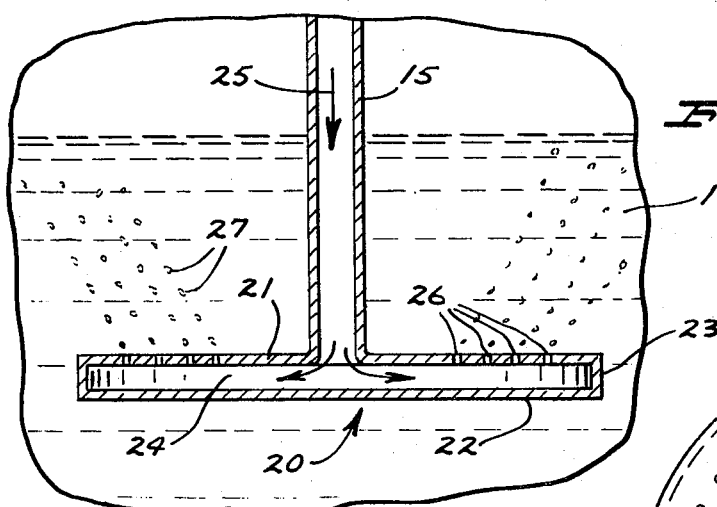
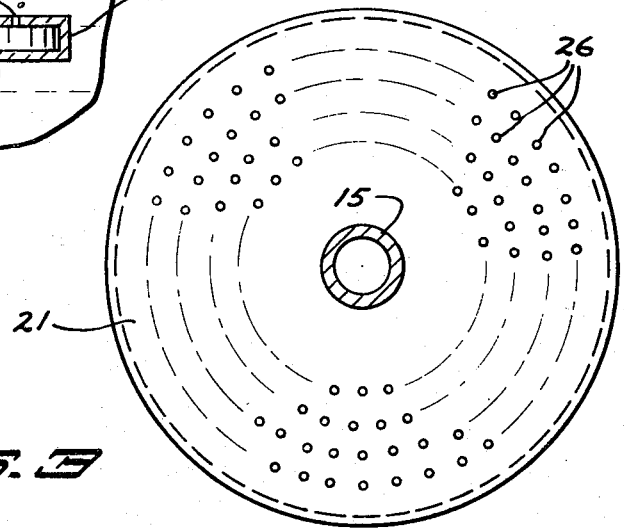

3,917,763

AERATOR

This is a continuation, of application Ser. No. 286,236, filed Sept. 5, 1972, and now abandoned.

BACKGROUND OF THE INVENTION

1. Field of the Invention

The present invention relates to rotating disc devices for dispersing a fluid into a liquid.

2. Prior Art

Aeration devices using rotating discs have been advanced in the past. Rotating discs are shown in U.S. Pat. No's. 1,242,445, 1,374,446 and 2,996,287. The U.S. patent to Greenawalt, U.S. Pat. No. 1,374,446 shows rotating disc-like elements with parallel walls and cylindrical edge walls but the openings in the disc are provided in not only the top and bottom walls but also in the edge walls. Limiting the openings in the bottom and outer edge walls is important in order to reduce horsepower requirements in relation to the effectiveness of the aeration. In the present device, the majority of the openings are positioned only on the top wall and in a particular relationship to the rotational axis in order to maximize the efficiency of the unit.

Also, U.S. Pat. No. 3,650,513 illustrates another type of aeration device which includes a rotating disc element.

SUMMARY OF THE INVENTION

The present invention relates to a rotating hollow disc element for mixing a fluid into a liquid in which the disc is rotating. The disc has a pair of upper and lower walls that are positioned substantially parallel to the plane of rotation of the disc. Fluid exchange openings are provided through the upper wall, primarily, in order to increase the efficiency of fluid dispersion in the liquid. The fluid is supplied through a hollow shaft on which the disc is mounted. The outer peripheral or edge wall of the rotating disc is substantially cylindrical and joins the upper and lower walls to form a chamber.

The location of the openings substantially only in the top wall of the disc greatly aids in increasing the efficiency of aeration so that the amount of fluid being dispersed per horsepower required is at a desirable high level.

A uniform annular disc, as shown minimizes the physical displacement of the water as the disc rotates. The air or other fluid being dispersed is swept off the upper surface of the disc in bubbles and the bubbles are carried outwardly without a great deal of turbulence. The small bubbles do not agglomerate into larger bubbles as they rise through the liquid. The smaller bubbles have a large surface area in relation to gas volume which promotes aeration.

BRIEF DESCRIPTION OF THE DRAWINGS

FIG. 1 is a part schematic side elevational view of an aeration device made according to the present invention shown supported over a pond or tank in position for operation;

FIG. 2 is a fragmentary enlarged sectional view taken as on line 2—2 in FIG. 1; and FIG. 3 is a sectional view taken as on line 3—3 in FIG. 1.

DESCRIPTION OF THE PREFERRED EMBODIMENT

Referring to the drawings, FIG. 1 shows schematically a pool or tank in which a liquid, such as water indicated at 10 is contained. This pool or tank would contain the liquid in which a fluid, such as air or another liquid, is to be dispersed. The term aeration as used herein means that a liquid is to have another fluid gas or liquid dispersed therein. Normally this is an introduction of air into a liquid, for example for aeration of sewage or the like. The term is meant to include the dispersion of a fluid into another fluid or a liquid by the structure of the device as disclosed.

Two aeration devices shown generally at 11 are mounted onto a support member 12 that is suitably supported with respect to the liquid 10 inside the lagoon or pool or tank, and these aeration devices each include a driving motor 13 which can be electrically powered, and which are mounted on a flange 14 of the support 12. The motors have output shafts that are hollow in this particular construction so that fluid can pass through the center openings of the shafts. The shaft of each of the motors has an outwardly extending tubular conduit 15 drivably attached thereto. The conduits 15 extend below the support 12 and below the upper surface of the liquid 10. The tubular motor shafts also are open at the top end of the motors 13 to suitable conduits 16 leading from a fluid source 17. The fluid source 17 can provide air under pressure, or another gas or a liquid that is to be dispersed in the liquid 10. Each of the conduits 16 is connected to its respective motor shaft with a suitable rotating coupling 18 of known design. The couplings 18 are merely swivel joints that will permit rotation of the motor shafts relative to the input conduits 16 while still carrying the fluid from the source 17 to the tubular conduits 15.

The tubular conduits 15 on each of the units has a disc assembly illustrated mounted on the lower end thereof. As shown, the disc assembly 20 on a first unit comprises an upper generally planar wall 21, and a lower generally planar wall 22 which are joined together with a substantially cylindrical end wall 23 to form an interior chamber 24 that is open to the interior of the respective conduit 15. Fluid entering as indicated by the arrow 25 through the tubular conduit 15 may flow into the chamber 24. As shown, the upper wall 21 has a plurality of openings 26 defined therethrough, and the lower wall 22 and outer edge wall 23 do not have any substantial number of openings. In other words the primary openings from the chamber 24 into the liquid 10 is through the upper wall 21 only. The majority of the openings are in this upper wall. The fluid being emitted coming from the openings in the upper wall disperses in small bubbles indicated at 27 that rise toward the top of the liquid 10 as the disc assembly rotates. The disc 20 can rotate in either direction of rotation, and as shown in FIG. 3, the openings 26 can be arranged in the circular pattern, or in a hexagon patter, or any desired pattern around the periphery of the upper disc.

Extensive experimentation has demonstrated that a substantial number of aeration holes in the bottom surface, for example through the wall 22, detract markedly from the efficiency of the unit. Holes in the peripheral or edge wall 23 also are unimportant and very little is gained from openings in this area. The holes 26 in the top wall 21 of the rotating disc projects small streams of air (when air is dispersed) into the water or liquid. The disc is moving at a modest velocity during this action. Much of the important aeration happens just at the point where the air first encounters the water. Bubbles then separate from the disc and rise to the surface. Additional aeration continues as these bubbles rise, thereby making greater efficiency as the depth of operation increases. This makes the unit having openings in the upper wall 21 only, efficient at depths of 10 to 20 feet and even greater. Deep operation causes higher gas pressure so that there is a proportionally greater capacity for the water to dissolve air as the gas pressure increases.

A substantial number of openings in the bottom wall 22 cannot project air or fluid far into the moving water because of the bouyancy of the air stream. The air coming out through the openings in the bottom tends to merge or agglomerate into a single large bubble and these large bubbles are inefficient for aeration. They will just move out past the outer edge of the disc and float upward as large bubbles.

In the device of the present invention, the opening size for openings 26 can range from 0.005 to 0.10 inches. The preferable range is from 0.015 to 0.030 inches. The smaller holes are more difficult to make because an extremely large number are needed in the disc, and the small holes are more likely to become plugged. A preferred location of the holes is generally from the outer edge of the disc assembly inwardly to about 20% of the radius. In other words the outer 80% of the disc radius is used for the openings in the preferred pattern for greatest efficiency. The hole pattern may be random or circular or hexagon or square. The preferred hole spacing as measured from the center of one hole to the center of an adjacent hole is about 10 to 40 times the hole diameter.

Disc diameters have been used from 4 inches to 48 inches and may be even larger. Peripheral velocity ranging from about two to twelve feet per second is found to be satisfactory, and desired air flow, defined in terms of velocity of the air leaving each of the small holes, has been found to be between 20 to 100 feet per second. This air flow gives satisfactory results. The depth of operation can range from a few inches below the surface of the liquid to 20 feet or more as stated previously. A few holes on the outer wall 23, or in the bottom wall 22 do not cause great inefficiency, and these holes may provide a small air or layer to minimize the drag of the water on the bottom surface of the wall 22. Therefore, in the present invention, it is desired that at least 75% or more of the openings which are used for aeration are located in the top wall 21 of the disc assembly and arranged as stated in the outer 80% of the radius.

The prior art, while showing a great variety of different opening locations, does not show the nonobvious hole location parameters for maximum efficiency of the unit, without increasing manufacturing costs. The present invention discloses the positioning of openings on the upper side to increase the operating efficiency of the unit during aeration operation.

An alternate construction is shown in FIG. 1 for the right most aeration unit. A small depending flange 29 can be mounted to form an annular wall around a rotating disc assembly 30, which is constructed in the same manner as the disc 20, and this flange forms a shallow pocket below the lower wall of the disc 30 in which air can accumulate to provide an air cushion to minimize water friction on the bottom wall of the rotating disc 30. This annular wall 29 is just like a skirt extending downwardly from the cylindrical wall 23 and actually can be formed as part of the cylindrical wall. The wall 29 extends downwardly beyond the wall 22 of the rotating disc assembly.

The rotating disc assembly has an outer cross sectional shape that is uniform around the axis of rotation to minimize turbulence. The provision of the fluid transfer opening substantially only in the upper wall further insures efficiency of operation of the aeration device.

What is claimed is:

1. A device for dispersing a fluid into a liquid, comprising a disc like member, means to mount said disc like member for rotation about an axis, said disc like member extending outwardly from said axis and comprising a pair of spaced top and bottom walls joined at their outer peripheral edges to form an enclosed chamber, a depending peripheral flange extending below the bottom wall, a source of fluid, a conduit open from said source of fluid to said chamber, a plurality of openings defined substantially only in said top wall through which fluid may pass from the chamber to the liquid as said disc is rotated, and at least one opening through said bottom wall within the area defined by said peripheral flange.

2. The combination of claim 1 wherein said openings range in size from 0.015 inches in diameter to a preferable range of 0.030 inches in diameter, with a maximum diameter of 0.10 inches in diameter.

3. The combination as specified in claim 2 wherein the centers of said openings are spaced apart between about 10 to 40 times the opening diameter and said disclike member is between 4 inches and 48 inches in diameter.

4. The combination as specified in claim 1 wherein said disc comprises two substantially parallel plate members spaced from each other, and a cylindrical wall joining said plate members at the outer peripheries thereof.

5. The combination of claim 1 wherein said openings are disposed in the outer 80% of the top wall member.

6. The combination of claim 1 wherein at least 75% of the area of the openings through the top and bottom walls are located in said top wall.

7. The combination of claim 1 wherein said top and bottom walls are substantially parallel in their general plane of extension and edge wall means joining said top and bottom walls to form said chamber, said openings defined in said top wall comprising at least 75% of the area of openings through said walls to said liquid, and said openings being positioned in the area located in the outer 80% of the radius of said top wall.

* * * * *

UNITED STATES PATENT AND TRADEMARK OFFICE
CERTIFICATE OF CORRECTION

PATENT NO. : 3,917,763
DATED : November 4, 1975
INVENTOR(S) : James P. Schafer

It is certified that error appears in the above-identified patent and that said Letters Patent are hereby corrected as shown below:

Column 4, line 35, (Claim 2, line 1) "Claim 1" should be -- Claim 6--.

Signed and Sealed this tenth Day of February 1976

[SEAL]

Attest:

RUTH C. MASON
Attesting Officer

C. MARSHALL DANN
Commissioner of Patents and Trademarks